United States Patent [19]

Down

[11] 4,360,000
[45] Nov. 23, 1982

[54] WOOD BURNING STOVE

[76] Inventor: Stanley L. Down, R.R. #3, 4 miles N. of Appin, Appin, Ontario, Canada, N0L 1A0

[21] Appl. No.: 122,954

[22] Filed: Feb. 20, 1980

[51] Int. Cl.³ .............................................. F24C 1/14
[52] U.S. Cl. .................................. 126/77; 126/163 R
[58] Field of Search ................ 126/163, 140, 77, 121, 126/15 R, 15 A, 290, 285 R

[56] References Cited

U.S. PATENT DOCUMENTS

| 3,942,509 | 3/1976 | Sasser | 126/121 |
| 4,019,492 | 4/1977 | Rush | 126/163 |
| 4,194,487 | 3/1980 | Cadwallander et al. | 126/77 |

*Primary Examiner*—Daniel J. O'Connor
*Attorney, Agent, or Firm*—McCarthy & McCarthy

[57] ABSTRACT

A wood burning stove comprises a fire chamber of which the upper part is constituted as a heat exchanger. A primary air supply is provided as is a secondary air supply, the secondary air supply permitting air to be mixed with the gaseous products of combustion to support complete combustion of those gaseous products. Both air supplies have dampers, the damper of the secondary air supply being automatic and opening as the damper of the primary air supply is closed. The secondary air supply comprises an inlet manifold interconnecting a plurality of tubular elements which form a fire supporting grate, the tubular elements leading the secondary air beyond the fire to a region in which mixing of that air with the gaseous products of combustion is effected, secondary air passing through the tubular elements being preheated by the burning fuel supported on the grate.

9 Claims, 4 Drawing Figures

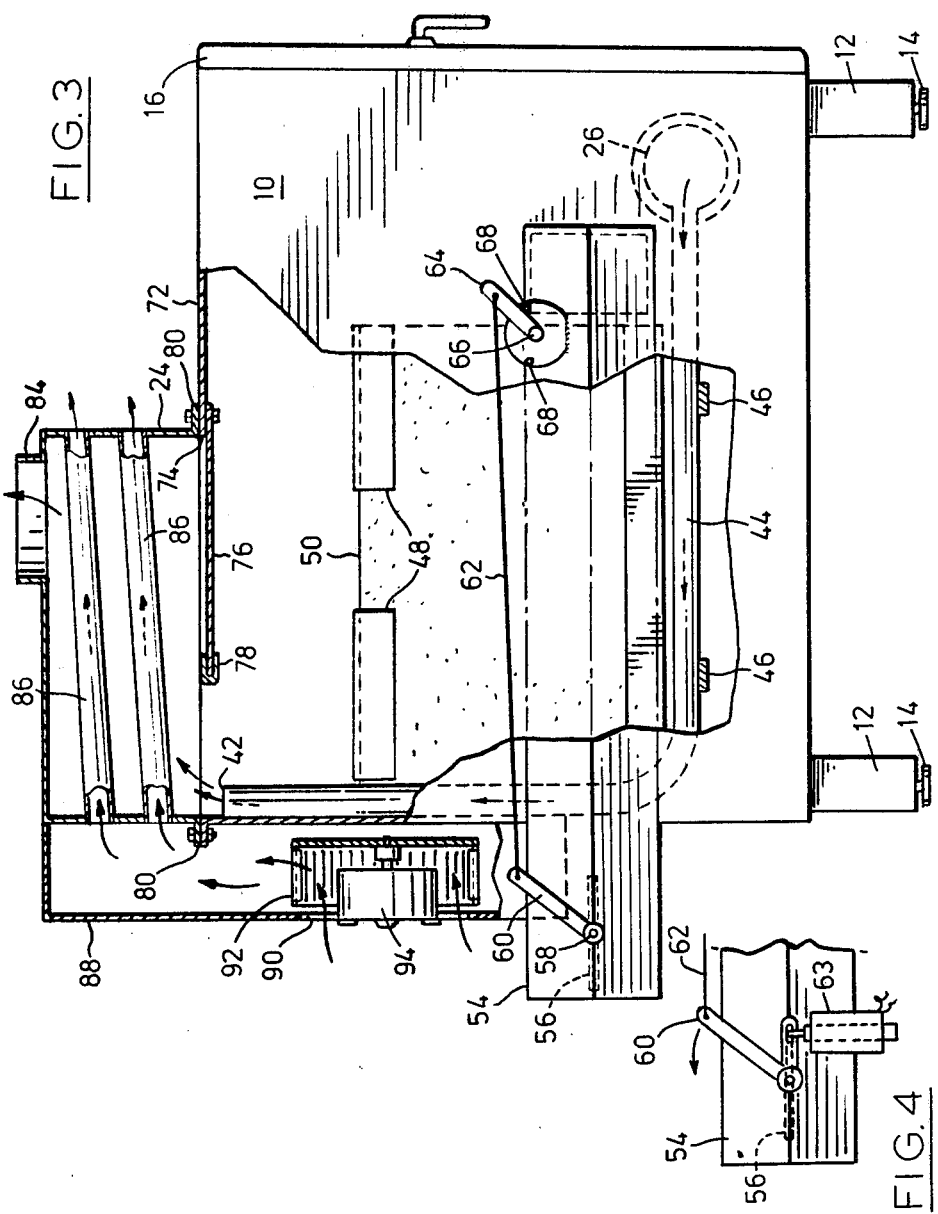

WOOD BURNING STOVE

This invention is concerned with wood burning stoves. A conventional wood burning stove has a grate upon which the fire is supported and some form of damper by which the supply of air to the fire is controlled. Often a thermostat is used to control the damper so that excessive quantities of wood are not burnt. It is well known that with such stoves, substantial quantities of unburnt gases are lost to atmosphere whenever the damper is in a position other than the fully opened position i.e. when the damper is controlling the heat output of the stove and with this loss the efficiency of these stoves is reduced. Attempts have been made to alleviate this problem by mixing secondary air with the unburnt gases to promote combustion.

An example of such a stove is described in U.S. Pat. No. 3,168,088 issued Feb. 2, 1965 to Perry S. Martin and Donald H. Gordon. That stove has a thermostatically controlled damper through which primary air is delivered to the fire and a permanently opened duct which leads secondary air to a secondary combustion chamber to which the products of combustion in the primary combustion chamber are directed. The duct has a heat exchanging relationship with the back wall of the stove so that air passing through the duct to the secondary combustion chamber is pre-heated.

The inventors of that stove apparently failed to perceive that the need for secondary air is most pronounced when the damper is closed, for it is under these circumstances that the completeness of combustion is markedly reduced. With the damper opened there is relatively little difficulty in achieving substantially complete combustion and under those circumstances the admixing of secondary air with the products of combustion in the secondary combustion chamber will in fact tend to cool the gases in that chamber and reduce the efficiency of the stove.

Another drawback with the stove of the aforementioned patent is that the preheating of the secondary air is indirect, it being effected by providing a baffle which conducts the products of combustion occurring in the primary combustion chamber, across the back wall of the stove and thence to the secondary combustion chamber, the secondary air duct, as noted hereinbefore, being in heat exchanging relationship with the back wall.

This indirect preheating is of course rather inefficient but it also induces a substantial constructional problem. The patentees, recognized that when the fire chamber door is opened for refuelling, the relatively massive quantities of air admitted to the fire chamber will, if permitted to pass around the baffle, result in substantial cooling of the secondary combustion chamber. Thus, the patentees resorted to bypassing the secondary combustion chamber when the fire chamber doors are opened and to this end, provided a damper effective to close the discharge or upper end of the secondary combustion chamber and to open the fire chamber directly to the flue.

To alleviate the problem of achieving complete combustion when the supply of primary air is reduced, while not reducing the efficiency of the stove when that supply is fully opened, it is proposed according to this invention, that a stove having primary and secondary air supplies should be provided with damper means in each supply and that the damper means should be arranged in such a way that as the damper means in one supply is opened, the damper means in the other supply is closed. In this way, as the supply of primary air is increased, the supply of secondary air is decreased and similarly as the supply of primary air is increased so that the unburnt gases from the fire are co-mingled with the secondary air to promote combustion.

Specifically, according to this aspect of the present invention there is provided a wood burning stove comprising a fire chamber, primary air supply means for admitting primary air to a lower region of the fire chamber, secondary air supply means for admitting secondary air to an upper region of the fire chamber to co-mingle with the products of combustion occurring in the lower region, each of said primary and secondary air supply means including control means operable to open and close those supply means, and means associated with the control means in the secondary air supply effective to cause said control means to close the secondary supply means as said control means of the primary supply means is opened. Most desirably the primary air is preheated by being passed through a passage in heat exchanging relationship with the fire chamber. It is also desirable to preheat this secondary air and this can be achieved according to a further feature of this invention by passing the secondary air through a tubular grate, this as discussed hereinafter.

Preferably, the upper region of the fire chamber is constituted as a heat exchanger and most desirably, air channels extend through this upper region, air passing through those channels being maintained separate from the products of combustion and being in heat exchanging relationship with the products of combustion. If desired, the passage of air through the heat exchanger may be induced by an appropriate blower.

Most desirably, the control means associated with the air supplies are dampers, the damper of the secondary supply means being weighted towards a closed position.

To avoid the problem of indirectly preheating the secondary air and therefore of being required to provide some way of bypassing the secondary combustion chamber when the door to the fire chamber is opened, it is proposed according to one aspect of this invention that the secondary air should be passed through a fire supporting grate formed of tubular elements, the air passing through those elements being heated directly by the fire supported upon the grate. In this way, very efficient preheating is obtained and no special bypass means need be provided since as the fire chamber doors are opened for refuelling, while it is true that there would be some cooling of a secondary combustion region adjacent the discharge ends of the tubular elements, upon closing the door, air at substantially the temperature prevailing at the fire would immediately be delivered to the secondary combustion zone.

Specifically, according to this feature of the present invention, there is provided a wood burning stove comprising a fire chamber, means for admitting primary air to said chamber and a fuel supporting grate within the fire chamber, the grate comprising a plurality of hollow tubular elements having inlet ends at which secondary air is admitted to said elements and discharge ends from which secondary air issues from the elements, portions of said elements intermediate said ends constituting a fire support region, said discharge ends being disposed so that secondary air, preheated in said intermediate portions of said elements issues to co-mingle with the gases from the fire to promote combustion of said gases.

Preferably, the inlet ends of the tubular elements are connected by a manifold which includes a damper and even more preferably that damper is arranged so that when a damper associated with the primary air admitting means is opened, the damper of the manifold is closed.

One embodiment of the present invention is illustrated in the accompanying drawings in which;

FIG. 3 is a part sectional, part elevational view of the wood burning stove of FIGS. 1 and 2; and FIG. 4 is a schematic drawing of a variant of a part of the stove of FIGS. 1 to 3.

Figure 2:
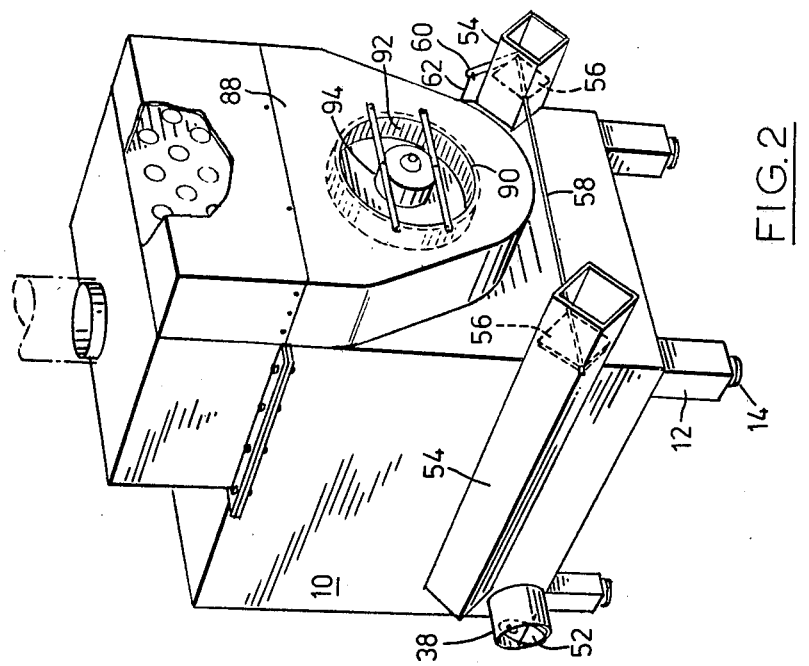
FIG. 2 is a rear perspective view of the wood burning stove of FIG. 1.
Figure 1:
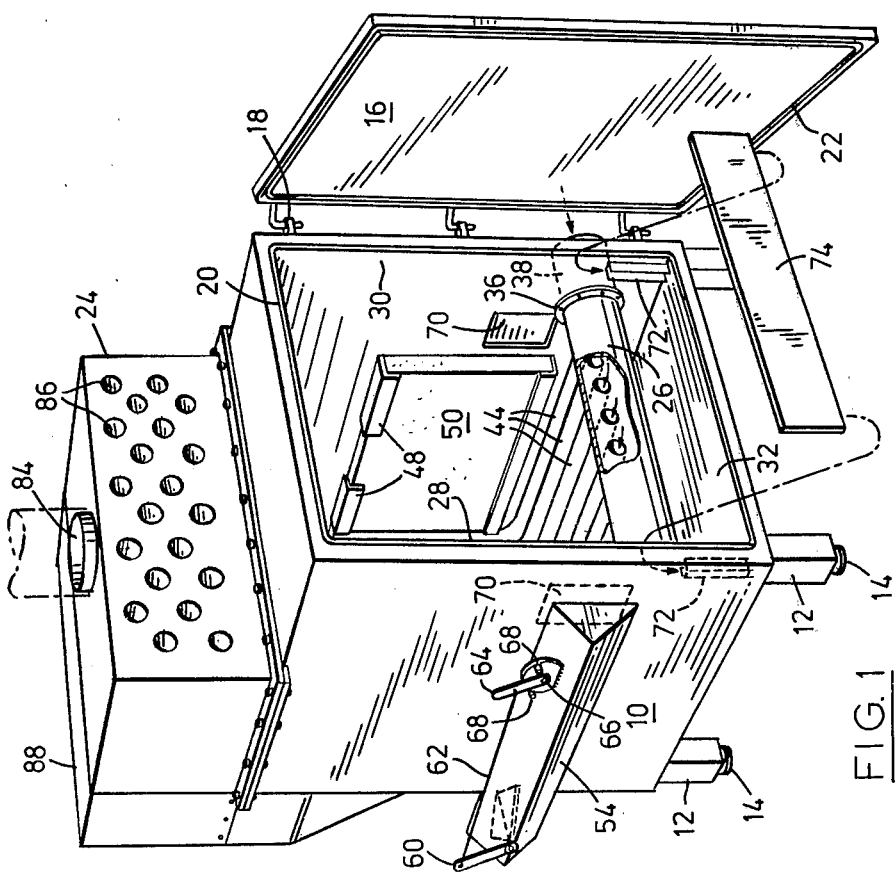
FIG. 1 is a front perspective view of wood burning stove according to the present invention.

The wood burning stove comprises a main body 10 supported upon legs 12 which have levelling feet 14. Body 10 is box-shaped having a door 16 hinged as at 18 and providing access to the interior of the body 10 through an open front wall. A projecting continuous rib structure 20 is formed adjacent the marginal edges of the front wall defining the door opening which, when the door is closed, extends into a matching groove 22 formed around the periphery of the door, in this way to effect a seal. Located atop the body 10 is heat exchanger 24 which, as will be described in more detail hereinafter, also defines an upper region of the combustion chamber or a secondary combustion chamber.

A manifold pipe 26 extends between side walls 28 and 30 of the body 10 and is located close to the front wall and spaced from the bottom wall 32 of the body. The pipe 26 is held in place by flanges 36 through which it is bolted to the side walls of body 10. Pipe 26 has a portion 38 extending to the exterior of the body 10.

A plurality of generally parallel tubular elements 40 extend rearwardly from connections to the manifold pipe 26 towards the rear wall of body 10 and, as can be seen particularly in FIG. 3, turn upwardly and terminate at discharge ends 42. These tubular elements together constitute a fire supporting grate and the portions 44 of those tubular elements constitute a fire supporting of the tubular elements. Secondary air passing through the tubular elements will tend to cool those elements in the process of being preheated which will contribute to the longivity of the grate storehouse.

A pair of straps 46 extend transversely of and are welded to the tubular elements between the sidewalls to support those tubular elements. The straps rest upon angle sections secured to the inner surfaces of the sidewalls of the body, those angles in turn serving to support refractory bricks 50.

The open end of the manifold 38 is provided with a pivoted and counter-weighted damper 52 which is normally closed but which opens upon demand as described hereinafter.

A pair of generally triangular section channels 54 are secured to the outer surfaces of each side wall of the body, those channels having generally rectangular section portions projecting to the rear of the body 10. A damper 56 is disposed in each of those projecting portions of the channels, each damper being mounted on a common pivot rod 58. A lever 60 is secured to the pivot rod 58 and a link 62 extends between the lever 60 and a control lever 64 mounted upon pivot 66 and movable between a pair of stops 68, those stops defining the fully opened and fully closed positions of the dampers 56.

At the ends of the channels remote from the dampers 56 openings 70 are formed in the sidewalls of the fire chambers and the channels and those openings constitute means for admitting primary air to the fire chamber. The channels 54 are in heat exchanging relationship with the fire chamber and thus the primary admitted to the chamber along those channels is preheated.

The dampers by being disposed away from the combustion zones, cannot be fouled by deposits from combustion and this amendment is improved.

A pair of opposed U-shaped guide rails 72 are secured in the lower regions of the sidewalls and are located towards the front wall to support a baffle 74, removal of which permits ash to be removed from the space below the grate constituted by the tubular elements 40.

As can be seen particularly in FIG. 3, the top wall 72 terminates at an edge 74 parallel to the front and rear walls of the body. Secured to that edge 74 is a baffle 76 the distal edge of which is supported by a cross support 78 secured to the side walls of the body.

A heat exchange unit 24 is mounted on top of the body that unit being provided with flanges 80 through which and through adjacent regions of the body, bolts are passed. The heat exchanger comprises a basically box-shaped unit with an inlet 82 defined between the distal edge of baffle 76 and the rear wall of body 10 of the stove. A circular discharge opening with a flange is provided for connection to a chimney and a plurality of tubes 86 extend from front to rear of the unit, the tubes being inclined upwardly the rear of the unit towards the front of the unit.

Secured to the rear wall of the stove is an air plenum 88 into which the tubes 86 open and which has an inlet opening 90 in which a squirrel-cage type blower 92 and its associated motor 94 are disposed to push air through the plenum chamber and through the tubes 86.

In operation, when there is a demand for heat, the dampers 56 are fully opened and primary air is supplied to the fire burning in the grate comprised of the tubular elements 40. At this time, since the fire is fully fuelled with air, the damper 52 of the secondary air inlet will remain closed under the influence of the counterweight. The gases emerging from the burning wood are substantially completely burned, there being sufficient quantity of primary air to achieve this end. However, when the dampers 56 are closed to conserve fuel, the slowly burning fire produces substantial quantities of combustible gases and the draft will cause the damper 52 to be opened so that air heated to high temperatures by passing through the grate upon which the fire is supported will issue at 42 to mix with the combustible gases and to cause those gases to be burned in the region of the heat exchanger which in effect constitutes a secondary combustion chamber, the primary combustion chamber of course being the fire itself.

By the adoption of the present invention, useful heat derived from a wood can be substantially increased. It will be appreciated that the dampers and or the blower may be controlled thermostatically if desired. Additionally, the blower could be omitted and natural convection could be relied upon to cause effective heat exchange to occur between atmospheric air and the products of combustion passing through the heat exchanger secondary heating zone.

Most desirable the dampers may be controlled, as shown in page 4 by a solenoid 63 which is responsive to a thermostat. The thermostat consequently is located to respond to the temperature within a room or are to be heated by the stove.

In order to improve heat exchange, it is desirable that the tubular elements constituting the grate and/or the tubular elements of the heat exchanger be provided with means to impart a swirling motion to air passing through those tubes.

We claim:

1. A wood burning stove comprising a fire chamber having a primary combustion region and a secondary combustion region, primary air inlet means for admitting primary air to the primary combustion region of said chamber, air control means for controlling the rate of admission of primary air through said primary air inlet means, and a fuel supporting grate within said fire chamber, said grate comprising of plurality of hollow tubular elements having inlet ends through which secondary air is admitted to said elements and discharge ends disposed at said secondary combustion region from which secondary air issues, fire supporting portions of said elements intermediate said ends constituting a fire support region at said primary combustion region, said elements including portions extending between said fire supporting portions and said discharge ends, said fire supporting portions of said elements constituting heat exchanger means for heating secondary air within said tubular elements, said discharge ends being disposed so that secondary air preheated in said fire supporting portions of said elements by combustion at said primary combustion region, issues from said discharge ends into said secondary combustion region to co-mingle with the gasses from the fire to promote combustion of said gasses, and air control means associated with said tubular elements for controlling the rate of flow of secondary air therethrough, said air control means associated with said tubular elements permitting an increased rate of flow of secondary to said secondary combustion region when the rate of admission of primary air through said primary air inlet means is reduced.

2. A stove as claimed in claim 1 wherein the inlet ends of said tubular elements communicate with a common manifold.

3. A stove as claimed in claim 2 wherein said manifold is provided with damper means effective to interrupt the flow of secondary air therealong.

4. A stove as claimed in claim 3 wherein said damper means comprises a counter-weighted flap normally closing said manifold.

5. A stove as claimed in claim 1 comprising a secondary combustion chamber into which the discharge ends of said tubular elements issue, said secondary combustion chamber including a plurality of heat exchange tubes extending therethrough and through which air is passed to be heated by the products of combustion.

6. A stove as claimed in claim 5 comprising means for inducing flow of air through said tubes.

7. A stove as claimed in claim 6 the said means for inducing movement of ambient air comprises a blower delivering to a plenum with which said tubes communicate.

8. A stove as claimed in claim 1 wherein means are provided for preheating primary air.

9. A stove as claimed in claim 8 wherein said means for preheating primary air comprises a duct in heat exchanging relationship with said fire chamber said duct forming rest of said means for admitting primary air to said chamber.

* * * * *